Figure 1:
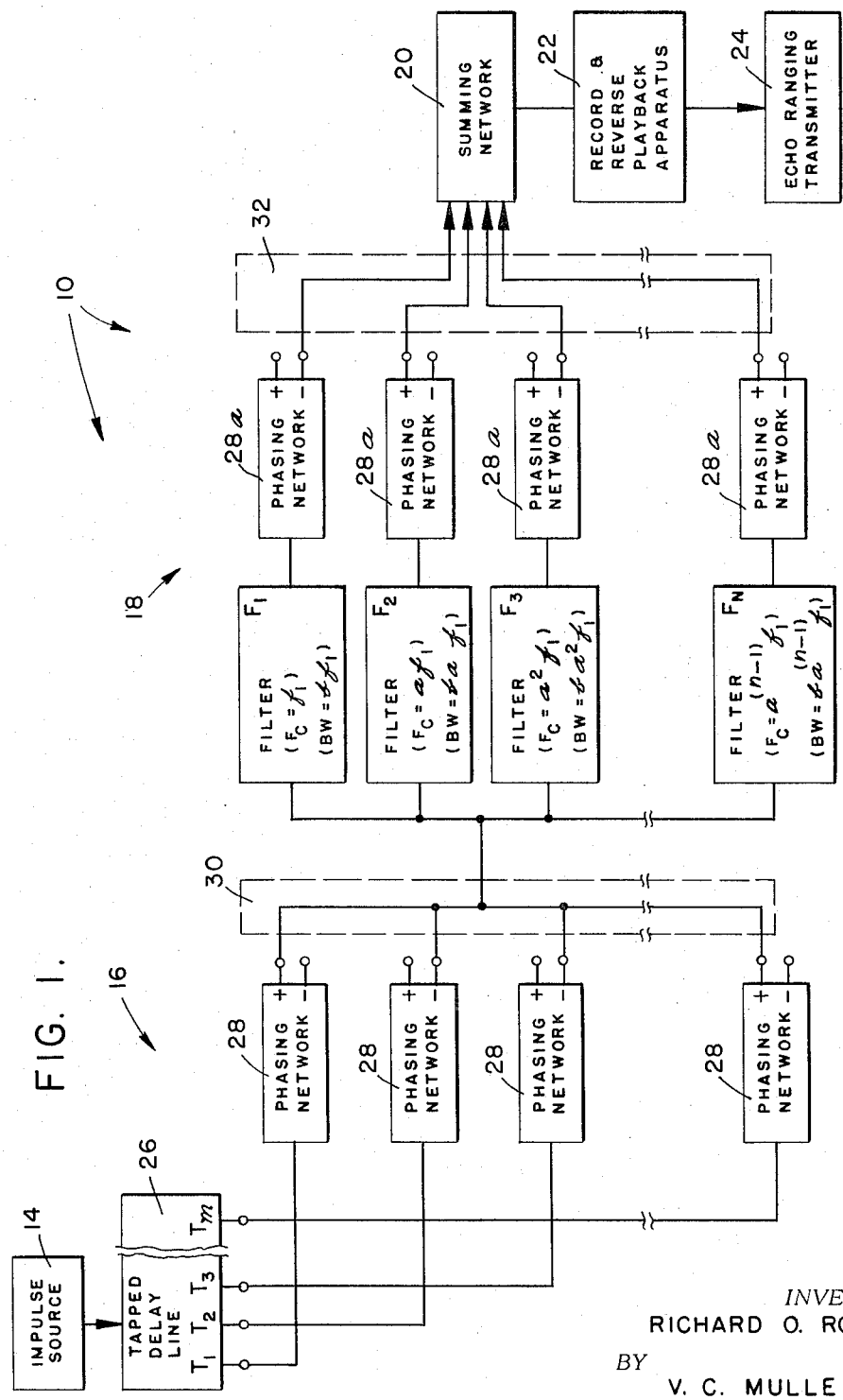

INVENTOR.
RICHARD O. ROWLANDS
BY
V. C. MULLER
ATTORNEY.

United States Patent Office 3,302,162
Patented Jan. 31, 1967

3,302,162
DOPPLER SONAR APPARATUS
Richard O. Rowlands, State College, Pa., assignor, by mesne assignments, to the United States of America as represented by the Secretary of the Navy
Filed June 4, 1965, Ser. No. 461,565
3 Claims. (Cl. 340—3)

This invention relates to an echo ranging system of the type which detects the presence of a Doppler condition in the return signal. More particularly, the invention relates to such an echo ranging system which uses a pair of matching filter units in its transmitter and receiving sections, respectively.

The lack of a suitable system of matching filter pairs for use in Doppler sensing sonars and acoustic torpedoes has been a serious problem, prior to the present invention. Prior art systems have employed a plurality of conventional comb filters in the receiver, with each comb filter of the plurality individually designed to pass a different Doppler condition. At the same time, it is often desirable to have an echo ranging system which provides fine Doppler resolution, and which therefore requires a capability to sense a large plurality of Doppler conditions. In the latter instances the use of the comb filter approach results in an undesired multiplicity of banks of filters in the receiver.

Among the known prior attempts to solve the problem is a system of matching filters, in which the transmitter unit consists of a bank of individual band pass filter elements having center frequencies in accordance with an arithmetic progression, and with the same band width for all elements. The receiver unit contains a bank of filters having a larger number of filter elements, having center frequencies corresponding to an expansion of the same arithmetic progression that is present in the receiver unit. Phase coding networks are connected to the outputs of consecutive sets of the expanded number of individual filter elements in the receiver unit. If Doppler shift has occurred in the return signal, it will pass through the phase decoding network connected to the consecutive set of filters having the frequencies that most closely correspond to the shifted frequency components in the return signal. However, it has been found that this aproach results in undesired signal loss when applied to the range of frequencies involved in connection with sonar and acoustic torpedo applications.

It is known that increasing the number of elements in the filter banks of a matching filter system increases the over-all system detection efficiency. The magnitude of efficiency increase is an exponential function of the number of individual elements in each bank. Therefore, beyond a certain size of filter bank, additional detection efficiency can only be obtained at considerable extra cost, complexity, and size of equipment.

Accordingly the objectives of the present invention include:

(1) Provision of an improved Doppler sensing echo ranging system of the type employing a pair of matching filter units in its transmitter and receiver sections, respectively, and which can be constructed to selectively detect the presence of any of a large plurality of individual Doppler conditions without need for the large multiplicity of receiver filter banks found necessary in the prior art.

(2) Provision of an improved system in accordance with the previous objective, and which is of special utility for use in sonars, acoustic torpedoes and the like.

(3) Provision of an improved system in accordance with the first mentioned objective, and which achieves a higher detection efficiency than heretofore obtainable within given space limitations, and (4) An improved matching filter unit for use in the receiver section of an echo ranging system and of a type which provides a plurality of separate output channels for different Doppler conditions, which matching filter unit is versatilely adaptable for use over a wide span of carrier frequencies, and in applications in which fine Doppler resolution is desired.

Figure 2:
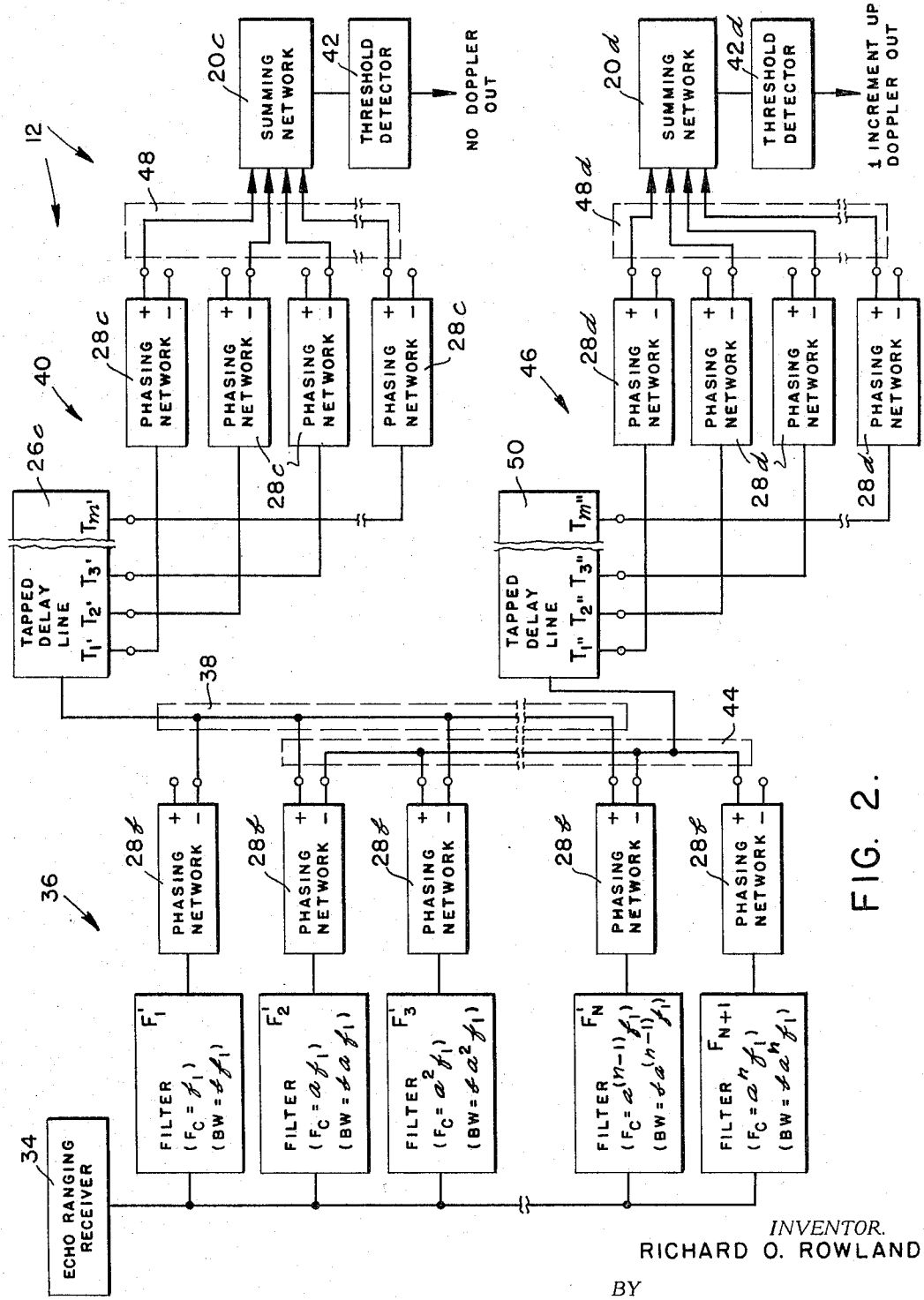

Other objects, advantages and novel features of the invention will become apparent from the following detailed description of the invention when considered in conjunction with the accompanying drawings wherein:

FIG. 1 is a block diagram of the transmitter section of an echo ranging system built in accordance with the invention; and FIG. 2 is a block diagram of the receiver section of such a system.

Referring now to the drawing, the invention has been illustrated in the environment of an underwater sonic echo ranging system comprising a transmitter section 10, FIG. 1, and a receiver section 12, FIG. 2. The echo ranging system is of the type which detects the presence of Doppler condition in the returning echo signal. For the sake of brevity and simplicity, the embodiment to be described is limited to the detection of only two Doppler conditions. These two conditions are: (1) a zero Doppler condition in which the echo signal returns unchanged, and (2) a Doppler condition which causes a design reference frequency, $f_1$, to be shifted to a frequency $af_1$ in the return signal, where $a$ is a suitable coefficient.

Transmitter section 10 generally comprises an impulse generator 14, of any suitable type, for generating single pulses in synchronously timed relation to the echo ranging pulses projected into the water. These pulses are applied to a pulse train and phase code matching filter unit 16, which in turn is connected to a band pass and phase code matching filter unit 18 containing a bank of individual band pass filter elements. The output of matching filter unit 18 is coupled to a summing network 20, and thence to a record and reverse playback apparatus 22, and finally to the transmitter unit 24 of the echo ranging system. The pulses produced by generator 14 have a pulse duration which is at least equal to the reciprocal of the maximum filter element bandwidth in matching filter unit 18.

Pulse train and phase code matching filter unit 16 comprises a tapped delay line 26 having a sequential series of $m$ number of taps. Of this series, only the first, second, third, and last taps, $T_1$, $T_2$, $T_3$ ... $T_m$, are shown on the drawing. The series of taps are disposed in predetermined spaced relationship along the delay line. A phasing network 28 is connected to each tap. Each phasing network has a pair of output terminals which provide the signal in unchanged, and reversed phase conditions, respectively, as indicated by positive and negative symbols in the drawing. A polarity coding network 30 comprises individual input leads for connection to one of each pair of terminals of each phasing network of the series. In accordance with conventional phase coding techniques, a random sequence of $m$ binary numbers is chosen, and the leads are connected to either the unchanged condition terminal, or negative phase condition terminal, of each phasing network of the series according to whether the corresponding digit in the code sequence is 0 or 1. As illustrated in the drawing, the sequence of phase connections for series of taps $T_1$, $T_2$, $T_3$ ... $T_m$ is +, —, —, ... +, which corresponds to the binary sequence 1, 0, 0 ... 1. The leads at the input of network 30 are connected to a common output lead, which forms the output of coding network 30.

Band pass and phase code matching filter unit 18 comprises a series of $n$ band pass filter elements $F_1$, $F_2$, $F_3 \ldots F_n$. The input end of each filter is connected to the common output lead of phase encoding network 30. The center frequency $F_c$ of filter $F_1$ is $f_1$, the design reference frequency mentioned at the onset of this description. The bandwidth of filter $F_1$ is $BW=bf_1$, where $b$ is a suitable coefficient. The center frequencies of the succeeding filter elements of the series are consecutively increased as a geometric progression proportional to frequency $f_1$ and to a power series of the coefficient $a$. Thus filters $F_2$, $F_3$ and $F_n$ have center frequencies $af_1$, $a^2f_1$, and $a^{(n-1)}f_1$, respectively. The bandwidths of the filters are proportional to their center frequencies, by the coefficient $b$. The output end of each filter is connected to an individually associated phasing network $28_a$. Phasing networks $28_a$ are identical in construction to the previously described networks 28. A polarity coding network 32 comprises individual leads for connection to the phasing networks $28_a$, in accordance with a random number binary code sequence. The leads of network 32 are individually coupled to summer 20 as separate inputs to same.

Record and playback apparatus 22 is operative to take the impulse-time characteristic of the signal from summer 20, and reverse it in time. In simplest form, apparatus 22 may consist of a magnetic tape device, which is reversible at high speed to play back a recorded signal, starting with the portion of the signal last recorded. This may also be done by the technique of applying the signal to a rotating magnetic drum device or other high speed recirculating memory device, and then using conventional time compression techniques to provide synchronous sequential sampling such that the samples precess in a reverse direction relative to the direction of circulation. The time compressed signal is then conventionally expanded for application to transmitter 24.

Receiver section 12 comprises the receiver unit 34 of the echo ranging system. The output of unit 34 is connected to a band pass and phase code matching filter unit 36. There are two separate output channels from the output side of unit 36. The first of these channels forms an output for indicating the presence of a return signal which is unchanged by any Doppler condition, and comprises a polarity coding network 38, a pulse train and phase code matching filter unit 40, a summer $20_c$ and a threshold detector 42. The second of these channels forms an output for indicating the presence of a return signal in which the design reference frequency $f_1$, is changed to $af_1$, and comprises a polarity coding network 44, a pulse train and phase code matching filter unit 46, a summer $20_d$, and a threshold detector $42_d$.

Band pass and phase code matching filter unit 36 comprises a series of $n+1$ parallel branches containing filter elements $F_1' \ldots F_{n+1}'$. Of this series, filters $F_1'$ through $f_n'$ are identical to filters $F_1$ through $F_n$ of matching filter unit 18 in the transmitter section. Filter $F_{n+1}$ has a magnitude of center frequency, $F_c=a^nf_1$, which is the next consecutive value in the previously described geometric progression of center frequency values of the series of filters, and has a bandwidth directly proportional to that of the other filters of the series, $BW=ba^nf_1$. To the output of each filter is connected a phasing network $28_b$.

Polarity coding network 38 includes input leads for phase connections to filters $F_1'$ through $F_n'$ of the series, but not to filter $F_{n+1}$. These input leads are connected in accordance with the same phase sequence as that provided by polarity coding network 32, in the transmission section. The individual input leads of network 38 are connected to a single common output lead, in turn connected to a pulse train and phase code matching filter unit 40. Unit 40 is essentially identical to unit 16 in the transmission section, with exception that the output side of polarity coding network 48 separately applies the signals from the phase taps of the phasing networks to the individual inputs of summing network $20_c$, rather than through a single common output line.

Polarity encoding network 44 provides phase connections for filters $F_2'$ through $F_{n+1}$, of the series of filters in unit 36, but not to filter $F_1'$, the first filter of the series. These input leads provide the same sequence of positive and negative connections as that provided by polarity phasing network 32, but with each connection advanced to the next consecutive filter of the geometric progression in powers of $a$. Polarity coding network 44 has a single common output line which is connected to a tapped delay line 50 in the pulse train and phase code matching filter unit 46. Delay line 50 is similar to delay line 26, but the predetermined spacing between its taps $T_1''$, $T_2''$, $T_3'' \ldots T_m''$ has been reduced from that of delay line 26 to match the predetermined intervals of time separating the pulses in a return signal changed by Doppler shift condition which shifts the design reference frequency $f_1$ to frequency $af_1$. The reduced spacing between taps needed for matching these intervals are calculatable in accordance with conventional calculations and known theory. The remaining portions of matching filter unit 46 and its associated output are identical to those of matching filter unit 40.

In the operation of transmitter section 10, the pulse from generator 14 enters pulse and phase code matching filter unit 16 and produces a sequential train of selectively phased pulses at its output. Band pass and phase code matching filter unit 18 takes this train of pulses and operates to pass only those frequency components which are within its individual band pass filters and to encode these frequency components in phase. The output of summer 20 thus has the combined characteristic of a selectively phased train of pulses in the time domain, and a selectively phased series of band pass components in the frequency domain. The time-impulse characteristic of this signal is then reversed by record and playback apparatus 22. The reversal of this impulse characteristic produces a resultant signal which matches the impulse response characteristics of the matching filter units in the receiver section.

The operation of receiver section 12 will now be described for the case of the return signal being unchanged by Doppler effect. The frequency components of the unchanged return signal match the impulse response characteristics of filters $F_1'$ through $F_n'$, and their phase conditions match the code of polarity coding network 38. While this signal will also be present at the inputs of polarity coding networks 44, the phase conditions of the individual frequency components will not match the code of the latter. In accordance with conventional principles of random number phase coding techniques, essentially no signal will appear at the output of network 44. Thus, the response characteristics at the output of coding network 38 of matching filter unit 36 and the returned signal are matched, allowing the return signal to pass to matching filter unit 40 via the single output line from network 38. The time intervals between the train of pulses of the unchanged return signal will match the delays between the taps of delay line $26_c$ and the condition of the individual pulses of the train of pulses will match the code of polarity coding network 48, so that matching filter unit 40 will pass the signal. The output from unit 40 passes through the summer and provides a signal of sufficient magnitude to actuate threshold detector 42 to indicate the presence of an unchanged return signal.

Consider now the case in which a Doppler effect condition so changes the return echo that the design reference frequency signal component, $f_1$, in the transmitted signal is shifted to a frequency, $af_1$ in the return signal. It can be demonstrated by conventional analytical techniques and known principles that the consecutive set of $n$ frequencies of the geometric progression of frequency components in the transmitted signal will appear in the return signal as the next higher consecutive set of frequencies of the geometric progression. Thus the transmitted signal frequency components $f_1$, $af_1$, and $a^2f_1$ will return as frequency components $af_1$, $a^2f_1$, and $a^3f_1$, respectively. The bandwidths of the returning band pass components are directly proportional to their new center frequencies. Thus the returning signal will match the composite impulse response characteristics of filters $F_2'$ through $F_{n+1}$, but will not have a component matching the response characteristic of filter $F_1'$. The phases appearing at the outputs of the filters $F_2' \ldots F_{n+1}$ will match the code of polarity coding network 44, but not that of network 38, so that the signal will be passed to tapped delay line 50. Since the spacing of taps on delay line 50 are selected to match the pulse intervals of the assumed Doppler condition, and since the phase conditions of the individual pulses of the train match the code of polarity coding network $48_d$, matched filter unit 46 passes the signal to actuate threshold detector $42_d$ and indicate the presence of such Doppler condition.

If desired, the invention may be adapted for generating and detecting the signal at some intermediate frequency range. This can be done so long as the center frequencies and bandwidths of the filters are chosen so that they form the desired geometrical progression when shifted to the actual transmitted frequency range. That is, if the difference between the intermediate and transmitted frequencies is $f_d$, the center frequency of the filters must be $f_1-f_d$, $af_1-f_d$, etc.

As may now be apparent, the present invention as disclosed and described herein, provides a scheme of matching filter units, by which Doppler sensing systems for a wide range of operating frequencies can be easily synthesized by simple calculations. Also, it will be apparent that the system can be constructed to sense a large number of Doppled conditions, representing different target velocity conditions, by simply expanding the size of progression of frequencies of filters included in the receiver's matching filter unit 36, and providing an additional decoding network for each consecutive set of $n$ filter elements in the expanded progression. It will be appreciated that such a construction overcomes the disadvantage of the extremely large multiplicity of filter bank and filter elements required in the approach of using an individually matched comb filter for detection of each different Doppler condition.

Further, it can be demonstrated, by convention calculations and known principles, that the inclusion of pulse and phase code matching filter units 16, 40 and 46 in the system, provides an overall detection efficiency proportional to log $mn$. By way of contrast, the band pass and phase code matching filter units 18 and 36, if used alone, would only produce a detection efficiency proportional to 10 log $n$. Delay line constructions are commercially available which are both compact and provide a very large number of taps, so that large values of $m$ can be obtained with less increase in overall size of the receiver section 12 than would be required by the approach of increasing the number of filter elements alone. It will therefore be appreciated, that within given space limitations, the use of a combination of band pass filters and tapped delay line filters results in appreciably higher detection efficiencies than if band pass filters, alone, were employed.

Obviously many modifications and variations of the present invention are possible in the light of the above teachings. It is therefore to be understood that within the scope of the appended claims the invention may be practiced otherwise than as specifically described.

What is claimed is:
1. In a Doppler sensing echo ranging system of the type including a matched set of first and second signal selective units, said first unit for encoding a signal for transmission to a target and said second unit for detection of the encoded signal in the echo signal returning from the target, said first and second signal selective units each comprising a predetermined series of parallel connected band pass filters and a frequency component phase selective means associated with said series of filters for passing only the output frequency components of the individual filters which are in either one or the other of opposite signal phase conditions in accordance with a predetermined random binary number code, the improvements, in combination, comprising:
 (a) the individual band pass filters of the series of filters of the first signal selective unit having center frequencies that increase in accordance with a first predetermined portion of a predetermined geometric progression, and having bandwidths that increase in proportion to their respective center frequencies, and
 (b) said individual band pass filters of the second signal selective unit having center frequencies that increase in accordance with a second and different predetermined portion of said predetermined geometric progression, and having bandwidths that increase in direct proportion to their respective center frequencies,
 (c) said first and second predetermined portons of the predetermined geometric progression being matched to allow only a signal encoded by the first signal selective unit and shifted by a predetermined Doppler condition to pass through the second signal selective unit.

2. Apparatus in accordance with claim 1, the improvements further comprising:
 (d) means for reversing the impulse-time characteristic of a signal connected to the output side of the first signal selective unit.

3. Apparatus in accordance with claim 2, the improvements further comprising:
 (e) said first signal selective unit further including a first pulse train and phase code network connected in series therewith and said second signal selective unit further including a second pulse train and phase code network connected in series therewith, said first and second pulse train and phase code networks each comprising a delay line having a series of taps and a pulse signal component phase selective means associated with the series of taps for passing only the outputs of the individual taps in either one or the other of opposite signal phase conditions in accordance with a predetermined random binary number code, and
 (f) the taps of the delay line of the second pulse train and phase code network being spaced such that it passes only the pulse signal components for a signal encoded by the first signal selective unit and shifted by said predetermined Doppler condition.

References Cited by the Applicant

UNITED STATES PATENTS 2,408,692 10/1946 Shore.
3,121,856 2/1964 Finney.

RODNEY D. BENNETT, *Acting Primary Examiner.*

R. A. FARLEY, *Assistant Examiner.*